United States Patent
Emelyanov

(10) Patent No.: US 9,766,915 B1
(45) Date of Patent: Sep. 19, 2017

(54) METHOD FOR CREATION OF APPLICATION CONTAINERS INSIDE OS CONTAINERS

(71) Applicant: Parallels IP Holdings GmbH, Schaffhausen (CH)

(72) Inventor: Pavel Emelyanov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 80 days.

(21) Appl. No.: 15/061,343

(22) Filed: Mar. 23, 2016

(51) Int. Cl.
*G06F 9/455* (2006.01)
*G06F 9/445* (2006.01)

(52) U.S. Cl.
CPC ............ *G06F 9/45545* (2013.01); *G06F 8/63* (2013.01)

(58) Field of Classification Search
None
See application file for complete search history.

(56) References Cited

U.S. PATENT DOCUMENTS

2009/0210873 A1* 8/2009 Cuomo ................. G06F 9/5077
718/1

* cited by examiner

*Primary Examiner* — Gregory A Kessler
(74) *Attorney, Agent, or Firm* — Bardmesser Law Group

(57) ABSTRACT

Method for partitioning containers includes instantiating a selected container under a host OS; opening a file system of the selected container for modification; inside the FS of the selected container, creating an image file of an Application Container; mounting a virtual disk that corresponds to the image file; mounting the Application Container file system inside the image file; defining boundaries of the Application Container; placing Application Container files inside the Application Container file system; and creating an interface between the selected container and the Application Container for exchanging data. The processes of the Application Container connect to processes of the selected container as if they were native host OS processes. The Application Container can only request data from the host OS through the interface of the selected container. The image file is protected from modification by the selected container. The processes of the Application Container are launched inside the boundaries.

11 Claims, 5 Drawing Sheets

METHOD FOR CREATION OF APPLICATION CONTAINERS INSIDE OS CONTAINERS

BACKGROUND OF THE INVENTION

Field of the Invention

This invention relates to a method for partitioning virtual execution environments based on user requirements, and more particularly, to partitioning Linux Containers.

Description of the Related Art

A modern trend of virtualization presents some challenges with regard to isolation of applications running in Virtual Machines or in containers. In conventional systems, applications run inside the containers, where the applications are isolated from other containers, but not from each other. If some applications have conflicting processes, the applications cannot be launched inside the same container. However, there are no existing systems that allow for creation and launching of isolated Application Containers inside the same container in order to isolate the conflicting applications and allocate the container resource quota more efficiently among different applications.

Accordingly, a method for creation and launching of Application Containers inside an container (or a virtual execution environment generally) is desired.

SUMMARY OF THE INVENTION

Accordingly, the present invention is directed to a method for creation and launching of Containers inside previously created containers that substantially obviates one or more of the disadvantages of the related art.

In one embodiment, a computer-implemented method for partitioning containers includes selecting a container under a host operating system (OS); in response to a request for partitioning the selected container, creating an image file of an Application Container opened inside a file system of the selected container; mounting a virtual disk that corresponds to the image file; mounting the Application Container file system inside the virtual disk; defining boundaries of the Application Container; placing Application Container files inside the Application Container file system; creating an interface between the selected container and the Application Container for exchanging data between running processes of the selected container and running processes of the Application Container; launching the processes of the Application Container inside the boundaries along with launching processes of the selected container outside the boundaries; and protecting the image file and the file system of the Application Container from modification by the selected container. The processes of the Application Container connect to the processes of the selected container as if processes of the selected container were native host OS processes. The Application Container has only access to the host OS through the boundaries of the interface of the selected container.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
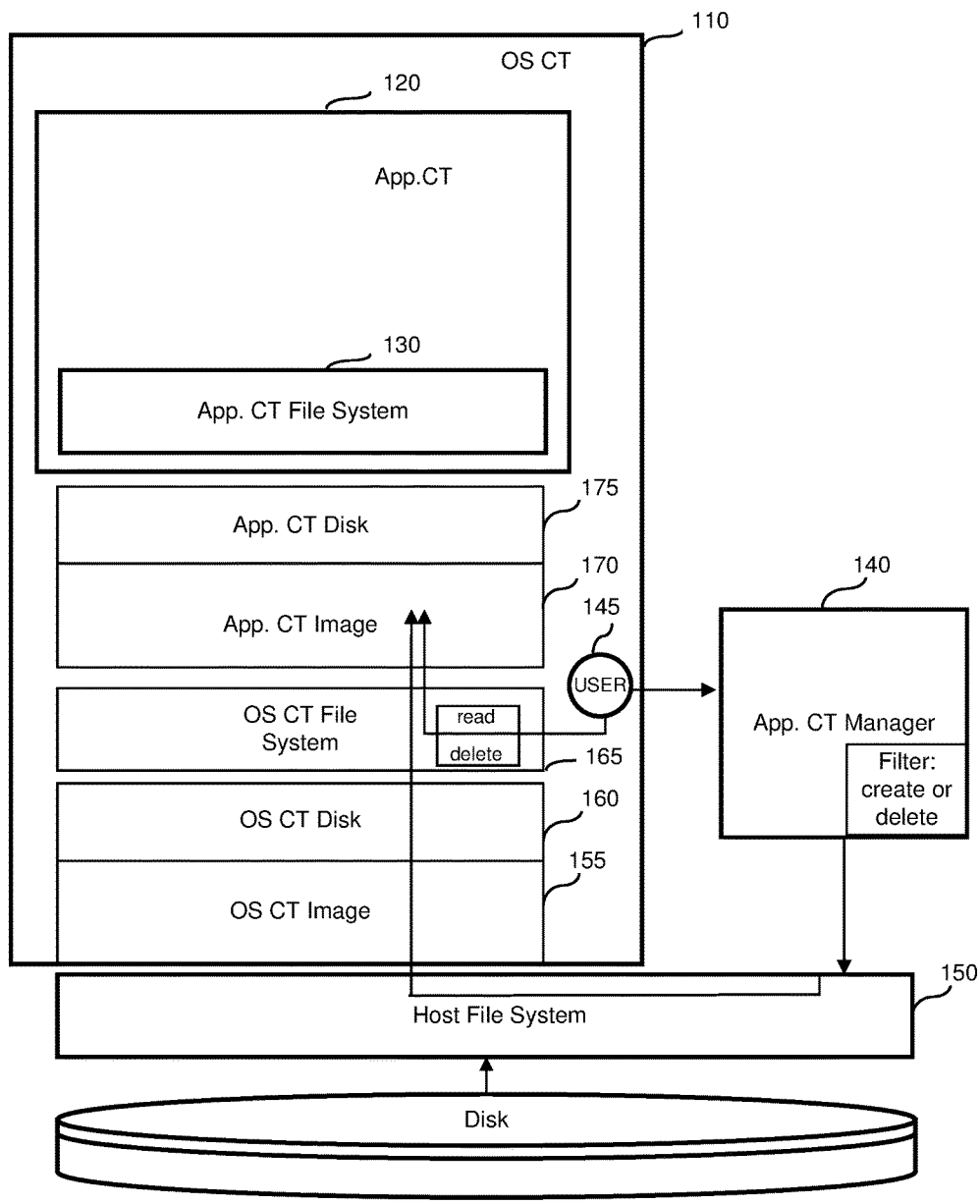
FIG. 1 illustrates a system structure, in accordance with the exemplary embodiment.

Reference will now be made in detail to the preferred embodiments of the present invention, examples of which are illustrated in the accompanying drawings.

The present invention is directed to a method for creation and launching of Application Containers inside the selected container. The following definitions are used throughout the description.

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Virtual Private Server (VPS), is one type of a Virtual Execution Environment (VEE) running on the same hardware system with a single shared OS kernel and sharing most of the system resources, where isolation of Virtual Execution Environments is implemented on a namespace level. A Virtual Private Server (VPS), often referred to as a "Container," is a closed set, or collection, of processes, system resources, users, groups of users, objects and data structures, that virtualizes the host OS through the kernel abstraction layer. Each VPS has its own ID, or some other identifier, that distinguishes it from other VPSs. A container acts as an isolated virtual server within a single machine, where multiple sets of application services are organized on a single hardware node by placing each into an isolated virtual Container.

The VPS/Container offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc. In other words, the full range of system administrator functions is desirable, as if the VPS were a dedicated remote server, with the existence of the VPS being transparent from the perspective of both the VPS user and the VPS administrator.

The discussion below is primarily in the context of OS containers, such as the VPSs described above, although it is understood that the concept is also applicable to VEEs generally, such as to VMs.

The primary concept described herein involves partitioning OS containers (such as LINUX containers, or WINDOWS containers) into lower-level containers that are nested within the OS containers. These lower level containers are referred to as "Application Containers", since a typical use case scenario involves one (or sometimes more than one) user application to which the Application Container is dedicated. To do this, an OS container needs to either already exist, or be instantiated (initialized and launched) under the host OS. A user then requests to partition the OS container. Thus, the file system of the OS container will be opened for modification. Inside the file system of the OS container, an image file of an Application Container needs to be created. This image contains all the information needed to initialize and start the Application Container, such as any initial settings, any executable files, any data files used by the application(s) for which it is intended, and so on.

A virtual disk that corresponds to the image file is mounted, and then, the Application Container file system is mounted inside the image file. The image file is protected from modification by the OS container. Boundaries of the Application Container need to be defined, which includes which resources are allocated to the Application Container, which permissions it has, which quotas it is allocated, and so on.

Application Container files are then placed inside the Application Container file system. These files may be copied from local storage, received from the OS container (e.g., they might be part of its file system already, and are already mounted), received from external server(s) or other sources, from network drives, and so on. An interface between the OS container and the Application Container needs to be instantiated, for exchanging data between processes of the OS container and processes of the Application Container. As far as the Application Container is concerned, its processes connect to the processes of the OS container as if the processes of the OS container were native host OS processes. However, processes of the OS container have permission to control execution of the processes of the Application Container.

The Application Container has no direct access to the host OS but can only request data from the host OS through the interface of the OS container. Once the Application Container is set up, the processes of the Application Container (i.e., the user applications, and any service processes of the Application Container itself) are launched inside the boundaries.

In one embodiment, a hardware node has LINUX OS installed on it with a set of files. A file system is mounted on a disk. The disk file system is implemented in such a way that an image of a separate file system can be created as a file. The image inside the file system can have another image created within it. A file inside the virtual file system contains a virtual file system and may contain another file with another file system. If required, the size of the file system image on the disk may be limited, and Container file systems may work based on limitations for the selected container established by the main (host OS) file system. One advantage of creation of the additional file system of the container inside file system of another container is that there is no need to organize quotas for nested containers.

According to the exemplary embodiment, a system has a components dedicated and configured to create Application Containers inside selected containers by direct interaction with the host OS. This components exist in host OS space, and in container space depending on the security rules. In one embodiment, the system has a security mechanism for protection against prohibited actions—e.g., creation or modification of Container images from inside the selected container since it can corrupt the entire operating system functionality. Here all containers along with file systems should be registered in the OS and supported by native virtualization means of the OS. For example, container ID may be invoked by OS container, but should be assigned by the OS. The components configured to create Application Containers is referred to an Application Container Manager, and is invoked either by system admin, or, sometimes, by a user (or owner) of the container.

The Application Container Manager is configured to build Containers only based on disk images created by a procedures of the main file system and with registration inside OS only. In one embodiment, the Application Container Manager can work with dedicated disk image using additional verification of these images and with mounting the image in the system by system procedures only. Here, consistency of the image is checked and the image is mounted in the system as another container file system image in a secure manner. An additional malware check may be performed. The hardware node can have several containers of different type running on it. Each container has its own file system which may be implemented on the virtual disk dedicated for container or to the set of containers, the disk image or file system image may be located in any file system in the form of image file or as a branch of file system tree. In latter case, the particular branch is hidden and/or inaccessible for processes not associated with this particular container.

A user of the container can control only his file system within the boundaries of the disk image of file system image. In the dedicated file system, the user can create new files, modify existing files and delete files. All of these operations can be performed on random access files that are not protected from the user of the container. The container uses the host OS kernel via standard APIs in a shared and isolated manner. This means that users of different containers are not warned that hardware node and operating system has other users or processes of other users. When the user needs to separate and isolate (or "encapsulate") several processes in a dedicated environment that is fully dependent on one of his containers, he can dedicate or select the container into which the group of processes will be encapsulated. In this way creation of the Application or encapsulation of the Container can "pretend" to be created inside the selected container. Since each container should, for system stability reasons, be created and registered under an OS, it is strictly prohibited to create additional containers by administrative means placed inside users' containers. So the selected container partitioning should be performed by the OS, but the result should look like the user created the Application Container himself, and the main environmental settings for the Application Container should be available for managing as a part of the selected container settings. Two daemons can be used to perform this task.

According to one exemplary embodiment, in order for the user of the OS Container to create the Application Container, the user has to make a request to the Application Container Manager, which is under control of the administrator (who is usually not the user of the OS Container).

The exemplary embodiment uses a filter, which determines the source of the request for creation of the Application Container. The filter located inside the Application Container Manager only allows for processing of the requests from the OS Containers for creation and deletion of the Application Containers, and optionally from those users that are authorized to make requests to create and delete Application Containers. Thus, the administrator can control creation and deletion of the Application Containers. According to one embodiment, the Application Container Manager is divided into two parts. One part is launched as a daemon (for LINUX, or similar for WINDOWS) inside the OS Container and performs all operations for creation of disk image files. The other part of the Application Container Manager runs directly under control of the host OS in kernel space. This part is also implemented as a daemon (for LINUX, or similar for WINDOWS), which identifies the requests from the daemon located inside the OS Container, initiates the virtual disk mounting process and creates an isolated space for each Application Container and launches the processes inside the Application Container.

In another exemplary embodiment, the daemon of the Application Container Manager inside the OS Container only intercepts the request from the OS Container for creation of the Application Container, protects the OS container from request execution and passes the request to the corresponding daemon of the Application Container Manager located outside the OS Container. The external daemon has permissions to act on behalf of the selected container user only. Here, the daemon can only partition the selected container which issues the request.

According to the exemplary embodiment, the OS procedures creates a disk image file (optionally) with virtual Application Container file system as a file or another part of the selected container file system. The disk image file into the file system of the selected container is then used for mounting the file system of the Application container. The file is protected from attempts to modify by any process of the selected container, even though the Application Container can do it via OS drivers and procedures. Meanwhile, a user of the selected container can read, parse, analyze and/or completely delete the file or file system branch dedicated for the application container.

A special driver of the host OS Ploop allows for working with the created file (image) of the Application Container as it were a virtual disk and for mounting a file system on it. The Ploop is a proprietary component developed by PARALLELS Inc., which is intended to be used instead of LINUX Loop component. Thus, the host OS creates a virtual disk with a file system. Note that Ploop is optional. A standard component LINUX Loop can be used instead of Ploop. The main goal is that the created file (image) is viewed by the host OS's file system as a virtual disk. Both Ploop and LINUX Loop can facilitate this. However, Ploop optimizes the process and can more efficiently store compacted data reflecting the disk inside the file disk image.

The user of the selected container receives a file system from a new virtual disk. The user of the selected container sees this file system as a part of his native file system. The file system from the new virtual disk for the Application Container is mounted into a tree of the file system of the selected container. Then, a visibility area of the Application Container is changed by "Change root" call. As a result, the Application Container sees only its own file system, and cannot directly access or modify the OS container's file system, or the host OS file system.

A user can select an application from random source or from a set of all applications belonging to his selected container (and optionally others made available to him by the administrator, even if they are in other selected containers) before creation of the virtual disk of the Application Container. Then the selected application files will be placed on a virtual disk intended for the Application Container. In some cases, different applications cannot be placed into the same Application Container due to conflicts created by the applications' processes (for example, conflicting writes to the same file, or two processes making conflicting modifications of the same system constants or parameters). Here dedicated different virtual file systems for different Application Containers can address access conflict issues. If the user of the Container is informed about incompatibility of some applications' processes ahead of time or can find out about it once the applications are launched. He can start the process of isolating applications in application containers. If the incompatible applications are launched in one Application Container, the conflicting applications can be isolated in different application containers or the Application Container with conflicting applications can be used as a selected container.

The user of the selected container requests the OS to create the Application container. The request should be intercepted and sent to Application Container Manager to launch an Application Container. The virtual Application Container Manager sends the request to the OS outside of the selected container. The Application Container Manager places the selected files of the user applications (or processes) into an Application Container isolated from other Application Containers running in the same selected container. The Application Container is assigned a unique identifier. Then the user of the selected container can if required give a part of the quota of the resources to the application container. In another option OS automatically permits the Application Container to use resources inside the dedicated container quota. Then, the Application Container can be launched, and the processes in the Application Container that correspond to the containerized user applications can start executing.

In one particular embodiment, the user of the selected container can call the host OS (directly or via the Application Container Manager) and dismount the Application Container after the completion the purpose of the application container. As an option, the user can simply delete files of the Application Container from the disk to free disk resource and produce impossibility of further usage of the application container. As another option the image file of the Application Container may be saved for next Application Container mounting, but the Application Container may be dismounted or uninstalled as well. As another option the user can duplicate image files of the application container and ask the OS for mounting this image for duplicated Application container. The dismounting can be performed with the deletion of the virtual disk or without it.

The Application Container can be deleted by either method based on the needs of the user of the selected container.

The Application Container is nested inside the selected container. All of the Containers use the same host OS kernel, which is virtualized using the kernel abstraction layer. The Application Container uses the OS kernel via a tree hierarchy using a wrapper selected container process. Deletion of an Application Container can be implemented in two ways. The selected container user can simply delete the Application Container file in his system. It causes the error in the Application Container execution which may be ignored.

The selected container user can also initiate deletion of the Application Container by making a request to the host OS, which redirects this request to the Application Container Manager. Then, the Application Container Manager deletes the entire Application Container, including its virtual disk. The selected container user receives a portion of his quota of the disk space back and can use it again with other Application Containers.

According to the exemplary embodiment, the nested images of the file systems are used for the user application processes of the Application Containers. The resource usage by the processes can be isolated and limited within a quota. The selected container user can allocate his resource quotas among processes by placing them in different Application Containers. These quotas can affect disk space and CPU time. This, advantageously, provides for more efficient resource allocation among the processes of the selected container. The system not only isolates the Application Containers from each other, but provides for an isolation of the selected container from the Application Containers, while allowing the selected container user to control the resources and delete the Application Containers that are frozen, in a deadlock state, failed or no longer needed.

FIG. 1 illustrates a system structure in accordance with the exemplary embodiment. An Application Container 120 with Application Container file system 130 runs inside an selected container 110. An Application Container Manager 140 controls the Application Container 120. While the Application Container Manager 140 is depicted as a single block in FIG. 1, in reality it is implemented as two daemon processes—one running inside the selected container and one in host OS kernel space. An selected container user 145 can request the Application Container Manager 140 to create or delete the Application Container 120. The Application Container Manager 140 goes through a host file system 150, selected container image 155, selected container disk 160, selected container file system 165 to access the Application Container image 170. The user 145 can only see his own file system 165 and an image file of the Application Container disk 175.

Figure 2:
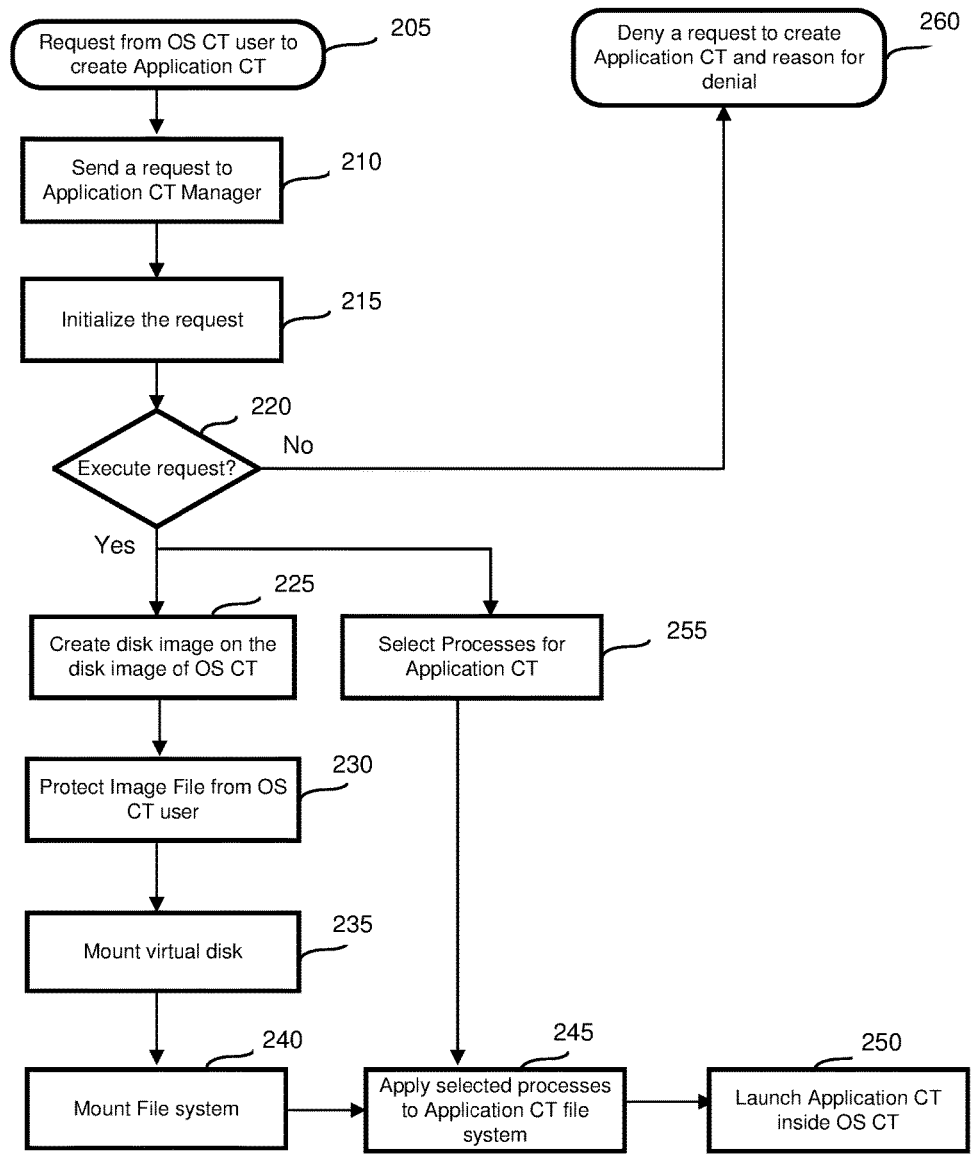
FIG. 2 illustrates a flow chart of a method for creating an Application Container inside an container, in accordance with the exemplary embodiment.

FIG. 2 illustrates a flow chart of a method for creating and launching an Application Container inside an selected container. In step 205, a request for creation of an Application Container from a user of the selected container is received. The process sends this request to the Application Container Manager in step 210. The request is initialized in step 215. If the request is not executed in step 220, the request to create an Application Container is denied in step 260 and the reason for denial is provided (e.g., unexpected error, quota exceeded).

Figure 3:
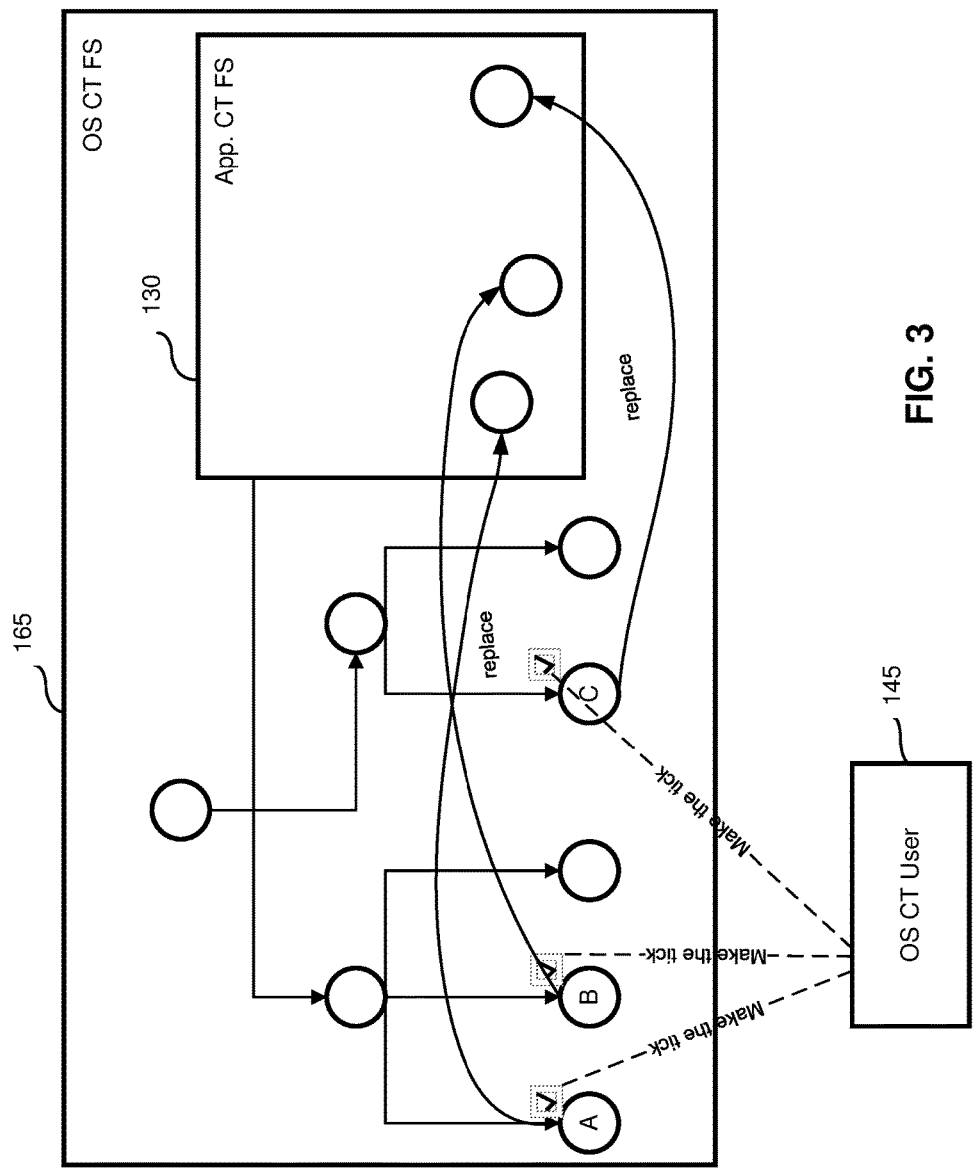
FIG. 3 illustrates selection of application processes of the selected container, in accordance with the exemplary embodiment.

Otherwise, the process creates a disk image on the disk image of the selected container in step 225. As a part of request execution, the process selects selected container user processes for the Application Container in step 255. The process protects image file from the selected container user in step 230. A virtual disk is mounted in step 235 and the file system is mounted in step 240. In step 245, the process applies selected processes from step 255 to the Application Container file system from step 240. Then, the Application Container is launched inside the selected container in step 250. FIG. 3 illustrates selection application processes of the selected container. The selected container applications A, B and C are selected by the selected container user 145 and moved to a separate tree branch of a tree of the file system 165. This branch becomes a file system of the Application Container 130.

Figure 4:
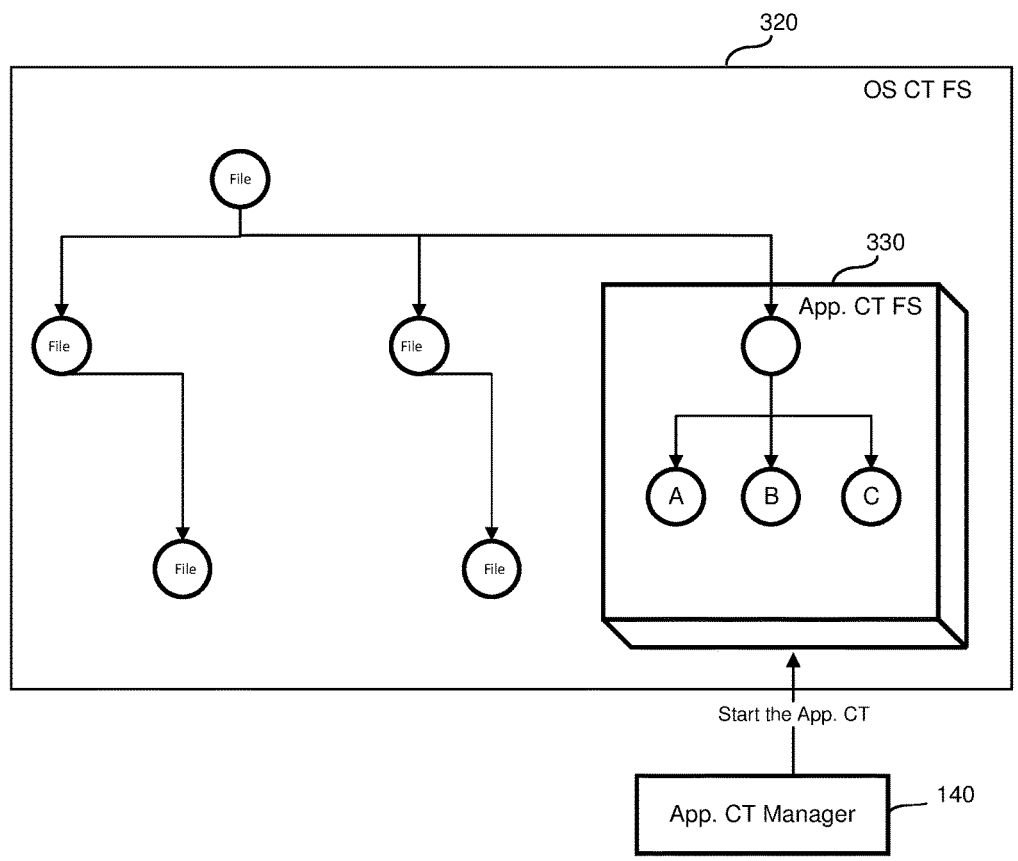
FIG. 4 illustrates launching of the Application Container based on processes selected by an selected container user.

FIG. 4 illustrates launching of the Application Container based on processes selected by selected container user. The Application Container is launched by the manager 140 using the Application Container file system 330 created from the selected container applications A, B and C moved from the selected container file system (see FIG. 3). Once the Application Container Manager 140 starts the Application Container, it becomes isolated.

Figure 5:
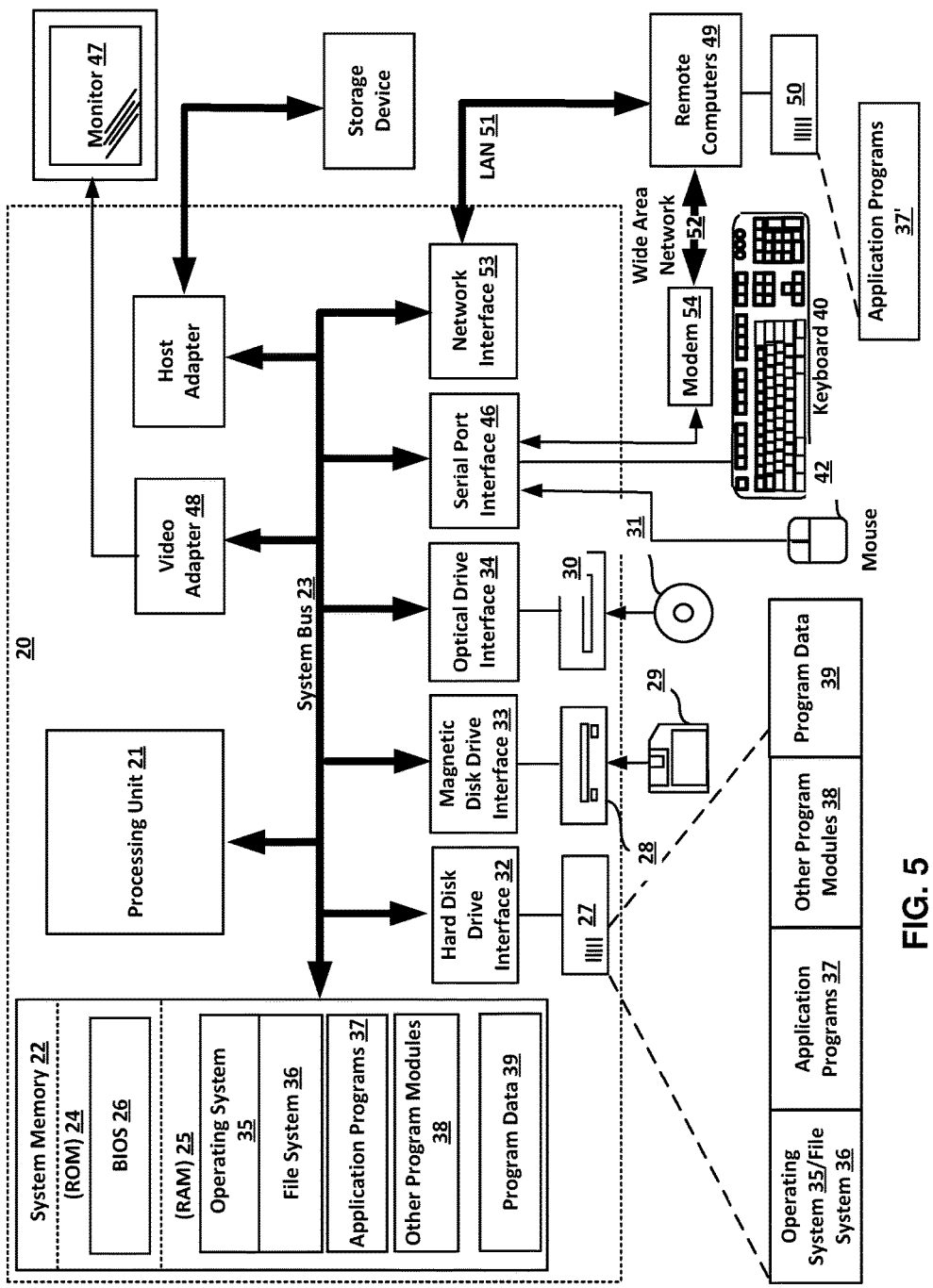
FIG. 5 illustrates a schematic of an exemplary computer system that can be used for implementation of the invention.

With reference to FIG. 5, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A computer-implemented method for partitioning containers, the method comprising:
    selecting a container under a host operating system (OS);
    in response to a request for partitioning the selected container, creating an image file of an Application Container opened inside a file system of the selected container;
    mounting a virtual disk that corresponds to the image file;
    mounting the Application Container file system inside the virtual disk;
    defining boundaries of the Application Container;
    placing Application Container files inside the Application Container file system;
    creating an interface between the selected container and the Application Container for exchanging data between running processes of the selected container and running processes of the Application Container,
    wherein the processes of the Application Container connect to the processes of the selected container as if processes of the selected container were native host OS processes, and
    wherein the Application Container has only access to the host OS through the boundaries of the interface of the selected container;
    protecting the image file and the file system of the Application Container from modification by the selected container; and
    launching the processes of the Application Container inside the boundaries along with launching processes of the selected container outside the boundaries.

2. The method of claim 1, further comprising selecting files of the selected container for partitioning and moving the selected files inside the Application container file system.

3. The method of claim 1, further comprising downloading files from an external sources into the Application container file system.

4. The method of claim 1, further comprising installing the application from the selected files, wherein after the selected files are placed either to file system of the selected container or to the file system of the Application Container, and a second choice of the application is installed, and
    isolating application processes inside the boundaries.

5. The method of claim 1, wherein the Application Container is an isolated environment that is nested within the selected container.

6. The method of claim 1, where boundaries are defined by assigning Application Container ID to applications selected to remain inside boundaries and wherein the started processes related to the application use the assigned container ID.

7. The method of claim 1, wherein resource quotas are applied to the selected container and are shared among the selected container and Application Containers nested within the selected container.

8. The method of claim 7, wherein Application containers quotas are controlled separately from the OS container.

9. The method of claim 1, wherein the processes executing inside the Application Container are isolated from processes of other containers and operating system processes on the same hardware device, except for processes of the selected container.

10. The method of claim 1, wherein the mounting of the virtual disk and the mounting of the file system for the Application Container is implemented by a Ploop driver.

11. The method of claim 1, wherein the steps of claim 1 are performed using first and second daemons,
    wherein the first daemon runs inside the selected container and defines the boundaries, and
    wherein the second daemon runs under the host OS and creates the image file and mounts the Application Container file system and a virtual disk of the Application Container.

* * * * *